(12) United States Patent
Anthony et al.

(10) Patent No.: US 12,743,061 B2
(45) **Date of Patent: *Sep. 22, 2026**

(54) PROMPT ENGINEERING FOR ARTIFICIAL INTELLIGENCE ASSISTED INDUSTRIAL AUTOMATION DEVICE CONFIGURATION

(71) Applicant: Rockwell Automation Technologies, Inc., Mayfield Heights, OH (US)

(72) Inventors: Michael J. Anthony, Milwaukee, WI (US); Clark L. Case, Aurora, OH (US); Michael P. D'Amico, East Troy, WI (US); Taryl J. Jasper, South Euclid, OH (US); Eryn Amara Danielle Manela, Ceveland Heights, OH (US); David C. Mazur, Mequon, WI (US); Jonathan A. Mills, Mayfield Heights, OH (US); Nathaniel S. Sandler, Cleveland, OH (US); Kurt D. Sneen, Park City, UT (US); David A. Snyder, Waukesha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 605 days.

This patent is subject to a terminal disclaimer.

(21) Appl. No.: 18/343,374

(22) Filed: Jun. 28, 2023

(65) Prior Publication Data

US 2025/0004428 A1 Jan. 2, 2025

(51) Int. Cl.
*G05B 13/02* (2006.01)

(52) U.S. Cl.
CPC ................................ *G05B 13/0265* (2013.01)

(58) Field of Classification Search
CPC ................................................ G05B 13/0265
See application file for complete search history.

(56) References Cited

U.S. PATENT DOCUMENTS

| | | | | |
|---|---|---|---|---|
| 7,966,523 | B2 * | 6/2011 | Weatherhead | G06F 11/3698 714/33 |
| 10,496,396 | B2 * | 12/2019 | Garvey | G06F 16/906 |
| 11,857,868 | B1 * | 1/2024 | Kestell | A63F 13/79 |
| 2003/0184596 | A1 * | 10/2003 | Kodosky | G06F 8/60 715/810 |
| 2012/0272146 | A1 * | 10/2012 | D'Souza | G06F 9/453 715/705 |

(Continued)

*Primary Examiner* — Christopher E Dunay

(57) ABSTRACT

The present technology relates to artificial intelligence assisted device configuration. In an implementation, an interface service of a device design application receives an input comprising an association between a device and a controller of an automation system design. The interface service then generates a first prompt requesting an application type associated with the device. The interface service next transmits the first prompt to a large language model and receives a first response to the first prompt from the large language model, wherein the first response includes the application type. The interface service then generates a second prompt requesting configuration settings for the device based on the system information and the application type. The interface service next transmits the second prompt to the large language model and receives a second response to the second prompt that includes configuration settings for the device. The interface service then displays the second response.

20 Claims, 8 Drawing Sheets

(56) References Cited

U.S. PATENT DOCUMENTS

2013/0211546 A1* 8/2013 Lawson .................... G06F 1/14
700/9
2014/0195126 A1* 7/2014 Prickel .................. A01B 71/02
701/50
2021/0208576 A1* 7/2021 Muenzel .......... G05B 19/41885
2021/0264296 A1* 8/2021 Martelaro ................ G06N 5/04
2021/0287121 A1* 9/2021 Veillon .................... G06N 5/04

* cited by examiner

PROMPT ENGINEERING FOR ARTIFICIAL INTELLIGENCE ASSISTED INDUSTRIAL AUTOMATION DEVICE CONFIGURATION

RELATED APPLICATIONS

This U.S. Patent Application is related to co-pending U.S. patent application Ser. No. 18/343,481 entitled, "PROMPT ENGINEERING FOR ARTIFICIAL INTELLIGENCE ASSISTED INDUSTRIAL AUTOMATION SYSTEM DESIGN," filed concurrently and co-pending U.S. patent application Ser. No. 18/343,551 entitled, "PROMPT ENGINEERING FOR ARTIFICIAL INTELLIGENCE ASSISTED INDUSTRIAL AUTOMATION DEVICE TROUBLESHOOTING," filed concurrently, which are incorporated herein by reference in their entirety for all purposes.

TECHNICAL FIELD

Various embodiments of the present technology relate to industrial automation environments and particularly to configuring devices of an industrial automation environment.

BACKGROUND

Industrial automation environments include complex systems that typically comprise various assets such as devices, machines, sensors, controllers, and interface software, among others. These assets are configured to work together seamlessly, but the process of configuring them can be challenging. For example, industrial automation machines can be complex, having multiple components, interfaces, and settings that need to be configured to work within the environment effectively. To ensure proper configuration, the engineers who configure the environment have technical expertise and specialized knowledge in different domains, such as mechanical, electrical, and software engineering. While machine learning (ML) algorithms may be used in industrial automation environments (e.g., to adjust a device setting based on sensor data), not much progress has been made in the design and implementation of accurate and reliable ML models that facilitate configuring the devices and assets of an industrial automation environment.

SUMMARY

Technology disclosed herein includes a prompt engineering interface service that integrates artificial intelligence with the programming systems of an industrial automation environment to configure one or more devices of the industrial automation environment. The prompt engineering interface service leverages the capabilities of a large language model (LLM) trained on industrial automation workflows to provide accurate and relevant configuration information. For example, the prompt engineering interface service may generate natural language prompts based on a user input to a device design application. The prompts may include instructions for obtaining additional context for configuring a device (e.g., in what system will the device operate, what inputs will the device ingest, what outputs will the device produce, etc.), device configuration data (e.g., ladder logic, graphic representations of the device design, etc.), and the like. The prompt engineering interface service may then transmit the prompt to an LLM and receive the desired response. Then, the prompt engineering interface service incorporates the content of the response into a user interface message for display to a user. Alternatively, the prompt engineering interface service may incorporate the content of the response with ladder logic and/or a graphical representation of the device and surface a graphical user interface (GUI) that includes the combined content.

In an implementation, a software application on a computing device directs the device to receive, via a GUI of a design application, an input comprising an association between a device and a controller in an automation system design. The software application then directs the device to generate a first prompt requesting an application type associated with the device. The first prompt is generated based at least in part on system information associated with the automation system design, the device, and the controller. The software application then directs the device to transmit the first prompt to an LLM and to receive a first response to the first prompt from the LLM. The first response includes the application type. The software application directs the device to generate a second prompt requesting configuration settings for the device based on the system information and the application type. The software application then directs the device to transmit the second prompt to the LLM and to receive a second response to the second prompt. The second response includes configuration settings for the device. The software application directs the device to display, via the GUI, the second response.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

While multiple embodiments are disclosed, still other embodiments of the present technology will become apparent to those skilled in the art from the following detailed description, which shows and describes illustrative embodiments of the invention. As will be realized, the technology is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Many aspects of the disclosure can be better understood with reference to the following drawings.

Figure 1:
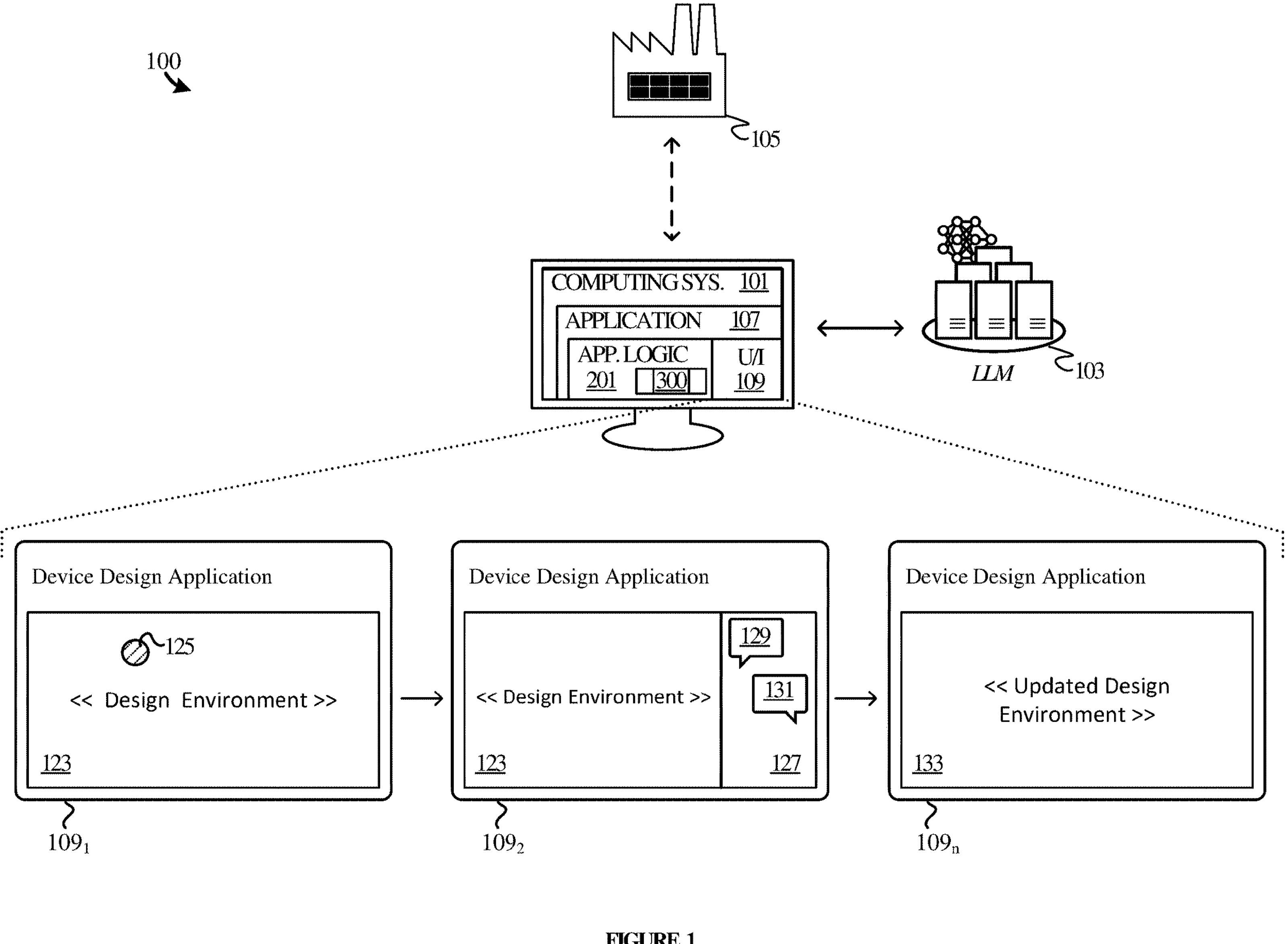
FIG. 1 illustrates an exemplary operating environment in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims. In the drawings, like reference numerals designate corresponding parts throughout the several views.

DETAILED DESCRIPTION

Various embodiments of the present technology relate to integrating device configuration process of industrial automation environments with prompt engineering techniques. Prompt engineering refers to a natural language processing concept that includes designing, developing, and refining input data (e.g., prompts) that are used to interact with artificial intelligence (AI) models, such as large language models (LLMs). The prompts are instructions that guide an AI model's behavior to produce a desired output. Unfortunately, it is difficult to engineer prompts for integration into the programming systems of industrial automation environments. For example, the consequences of errors in configuring industrial automation processes can be widespread and catastrophic. As such, failure of a generative AI tool to produce accurate responses for a device configuration process could result in device malfunction, safety risks, and significant financial losses. Additionally, concerns about data privacy and security in industrial automation environments can limit the availability of data needed for training and testing AI models. Thereby making it challenging to build accurate and reliable models that can be used in industrial settings.

To address these issues, a prompt engineering interface service is described herein that optimizes device configuration for industrial automation systems. The prompt engineering interface service utilizes past workflows (e.g., saved projects, etc.) and application context of industrial automation environments to respond to user inputs with accurate and relevant configuration information. The prompt engineering interface service may use a variety of techniques such as natural language processing, machine learning, and deep learning to develop accurate and effective prompts for use with large language models, chatbots, virtual assistants, and the like. For example, the prompt engineering interface service may generate natural language prompts for surfacing in a user interface (e.g., of a human-machine interface) to obtain additional context, for obtaining relevant and accurate responses from large language models, and the like.

In an embodiment implemented in software on one or more computing devices, an interface service receives an input and determines (e.g., based on the input) that a user is attempting to configure an industrial device. For example, a user may provide an input requesting an answer to the question, "How do I configure my drive to establish a connection to my controller over my network?" The interface service contextualizes the input to determine if the user's request pertains to a device, a process, troubleshooting, etc.

After determining that the user is attempting to configure a device, the interface service may perform further categorization of the input to determine a context of the device. If the context of the device and/or system is not clear, then the interface service may obtain the context by requesting additional input from the user. For example, in response to the user's request regarding the drive configuration parameters, the interface service may determine that the categories needed to adequately answer the question include product type, application type, network topology, and power capability. Some of the category data may be known by the interface service (e.g., based on available customer data, inputs from a user in a design environment, or the like). The interface service may generate a prompt (e.g., in natural language) pertaining to any unknown categories and cause the user interface to be displayed in a user interface. For example, the interface service may identify the type of application (e.g., a drive for a conveyor system) and the power capability of the system (e.g., 480V), but may not know the type of product, the network topology, etc. In this case, the interface service generates a prompt requesting the user to provide information about the type of product and/or network topology and displays the prompt in a human-machine interface (e.g., that connects the user to the device).

If the interface service receives a reply to the prompt that matches known device data, then the interface service provides a relevant and accurate response to the user's initial input that includes the requested configuration information. If the interface service cannot match the prompt reply to known device data, then the interface service continues to generate and surface prompts requesting information that facilitates identifying a relevant category and ultimately matches the prompt reply to known device data. After matching the reply with the known product data, the interface service generates a relevant and accurate response to the initial user input, the response including the requested configuration information.

Configuring devices of an industrial automation environment can be a challenging task, owing in part to the complexity of the devices and the systems they operate in. Proper configuration ensures efficient, safe, and reliable operation of industrial automation systems. By generating prompts and leveraging the capabilities of an LLM, the device configuration operations described here obtain the precise configuration information necessary to optimize efficiency, safety, reliability, and other key performance factors for specific devices within an industrial automation environment. This approach ensures that each device is uniquely configured based on its specific characteristics, resulting in optimal performance and minimized downtime. Technical advantages of the device configuration operations disclosed herein further include increased computational efficiency and adaptability. By leveraging advanced modeling techniques, these operations require less power consumption by local computing devices, resulting in optimized resource usage. Additionally, the models associated with these operations can learn from new data and adapt their behavior over time, improving the accuracy and efficacy of configuring devices within an industrial automation environment.

Figure 8:
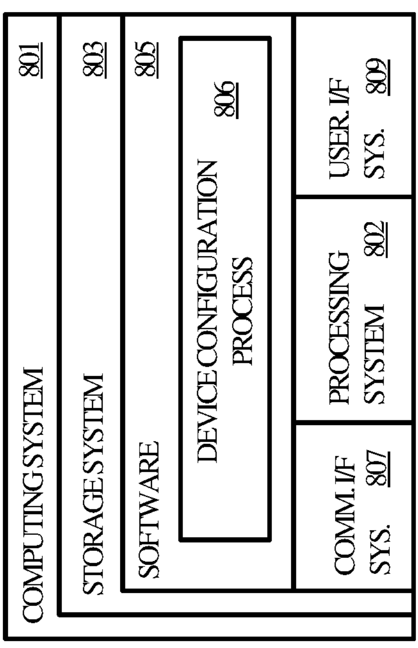
FIG. 8 illustrates a computing system suitable for implementing the various operational environments, architectures, processes, scenarios, and sequences discussed below with respect to the other Figures.

Turning now to the Figures, FIG. 1 illustrates operating environment 100 in an embodiment. Operating environment 100 includes computing system 101, model 103, and industrial automation environment 105. Computing system 101 is representative of any physical or virtual computing resource, or combination thereof, suitable for executing application 107, of which computing device 801 of FIG. 8 is representative. Examples of computing system 101 include, but are not limited to, personal computers, laptop computers, tablet computers, mobile phones, wearable devices, external displays, virtual machines, and containers, as well as any variation, combination, or collection thereof. Computing system 101 may communicate with model 103 and/or industrial automation environment 105 via one or more network connections, examples of which include internets and intranets, the Internet, wired and wireless networks, low power wireless links, local area networks (LANs), and wide area networks (WANs). Computing system 101 includes application 107. Though computing system 101 is depicted as being separate from industrial automation environment 105, it is contemplated herein that computing system 101 may be located on the premises of industrial automation environment 105 or connected remotely thereto, for example, via a cloud-based application.

Model 103 is representative of an LLM capable of processing natural language requests to generate a desired output (e.g., a natural language response, computer code, etc.). Examples of model 103 include a Generative Pre-trained Transformer (GPT) model, a Bidirectional Encoder Representations from Transformer (BERT) model, and the like. Example models include GPT-2, GPT-3, GPT-4, BLOOM, LaMDA, LLAMA, MICROSOFT TURING, and the like. Further, new models are developing that accept other modes of input including text, audio, video, images, and the like, which are referred to as large multi-mode models (LMMMs). Accordingly, model 103 may be an LLM or an LMMM. While language throughout refers to an LLM, LMMMs may be interchanged. Model 103 may be trained (e.g., via application 107) using content of an embeddings database and/or domain (not shown). An embedding database includes natural language content that is organized and accessed programmatically. The natural language content includes an embedding, which is a vector notation representative of the content as processed by a natural language model. Content of an embedding database may include device configurations from previous projects, device configurations of sample projects, existing validated documents, programming manuals of devices of an industrial automation system, relevant specifications of devices of an industrial automation system, helpdesk articles and submissions associated with industrial automation systems, customer support tickets, etc. Though model 103 is depicted as being separate from industrial automation environment 105, it is contemplated herein that model 103 may be hosted on the premises of industrial automation environment 105 or hosted on a server remote to industrial automation environment 105.

Industrial automation environment 105 is representative of an industrial enterprise such as an industrial mining operation, an automobile manufacturing factory, a food processing plant, an oil drilling operation, a microprocessor fabrication facility, etc. Industrial automation environment 105 includes various machines, such as drives, pumps, motors, compressors, valves, robots, and other mechanical devices. The machines, systems, and processes of industrial automation environment 105 may be located at a single location or spread out over various disparate locations.

Application 107 is representative of a device design application implemented in software and, when executed by computing system 101, renders user interface 109. Application 107 is implemented in program instructions that comprise various software modules, components, and other elements of the application. Software 805 of FIG. 8 is representative of application 107. Application 107 may be a locally installed and executed application (e.g., of computing system 101), a desktop application, a mobile application, a streamed (or streaming) application (e.g., a cloud-based device design application accessed by computing system 101), a web-based application that is executed in the context of a web-browser, or any other type of application capable of employing application logic 201. Some commercial examples of application 107 include, but are not limited to, Rockwell Automation Studio 5000®, FactoryTalk Design Studio®, FactoryTalk Logix Echo®, and the like.

Application logic 201 (as illustrated by application logic 201 of FIG. 2) is representative of some of the functionality that may be provided by one or more of the software elements in application 107. For example, application logic 201 may be a plug-in that may be added to or otherwise accessed by application 107. Application logic 201 performs functionality such as process 300, which is described in more detail with respect to FIG. 3. Application logic 201 may be implemented in program instructions in the context of any of the software applications, modules, components, or other such elements of application 107. When the program instructions are executed by one or more processors of computing system 101, application 107, via application logic 201, may direct computing system 101 to operate as follows.

In an embodiment, computing system 101 displays, via application 107, exemplary user interfaces $\mathbf{109}_1$-$\mathbf{109}_n$. User interface $\mathbf{109}_1$ includes an initial view of design environment 123. Design environment 123 includes an integrated device configuration environment in which users may view an industrial automation system; configure devices such as controllers, Human Machine Interfaces (HMIs), Electronic Operator Interfaces (EOIs), etc.; and manage communications between the devices. Design environment 123 may further include one or more of the following editors: ladder diagram, function block, structured text, sequential function chart, etc.

User interface $\mathbf{109}_1$ also includes user input 125. User input 125 may include a drag-and-drop of a graphic representation of an industrial device (e.g., a driver of a conveyor system, a pump, a motor, a compressor, a valve, a robot, a program logic controller, etc.), an alpha-numeric query (e.g., a request for information, etc.), a mouse click, a gesture, a voice command, and the like. User input 125 may also include an association between a device and a controller in an industrial automation system design. The association between the device and the controller may include an attempt to connect the device with the controller, placing graphical representations of the device and the controller in a design environment, interacting with a communication channel between the device and the controller, etc.

Responsive to receiving user input 125 via user interface $\mathbf{109}_1$, application 107 employs application logic 201 to generate a prompt (not shown) for submission to model 103. The prompt contains a natural language query requesting configuration information based on a context of user input 125. Examples of context include history of a chat between a user and application 107, user information stored in association with a user's account, a product type, an application type, a network topology, a customer company, a power capability, available IP addresses, subscription identifiers or accounts, edits to a design environment of the industrial automation environment, etc. After receiving the prompt, model 103 replies to application 107 with the configuration information.

Next, computing system 101 displays, via application 107, user interface $\mathbf{109}_2$. User interface $\mathbf{109}_2$ includes the initial view of design environment 123 as well as messaging panel 127. Messaging panel 127 is representative of a chat window through which a user communicates with application 107 (e.g., via application logic 201, etc.). Messaging panel 127 may include buttons, menus, or images that can be used to provide additional information or context. Though messaging panel 127 is depicted as being a sidebar panel of user interface $\mathbf{109}_2$, it is contemplated herein that messaging panel 127 can be any user interface component capable of supporting user interactions with application 107 in a natural and conversational manner. For example, messaging panel 127 may be a popup or dialog window that overlays the content of design environment 123, and the like.

Messaging panel 127 includes messages 129 and 131. Application 107 generates message 129, which computing system 101 surfaces in user interface $\mathbf{109}_2$. For example, application 107 may generate message 129 in response to receiving user input 125, in response to receiving a reply from model 103, a combination thereof, etc. Message 129 may include a request for contextual information, a request to facilitate the configuration of a device of design environment 123, and the like. Message 131 includes a user's reply to message 129. In the present embodiment, message 131 includes an acceptance of the device configuration help offered by message 129.

In response to message 131, application 107 configures the device of design environment 123 (not shown) and causes user interface $\mathbf{109}_n$ to be displayed by computing system 101. User interface $\mathbf{109}_n$ includes updated design environment 133, which includes the configured device (not shown). Application 107 may also configure a device of industrial automation environment 105. Configuring the device of industrial automation environment 105 may be in response to message 131.

Figure 2:
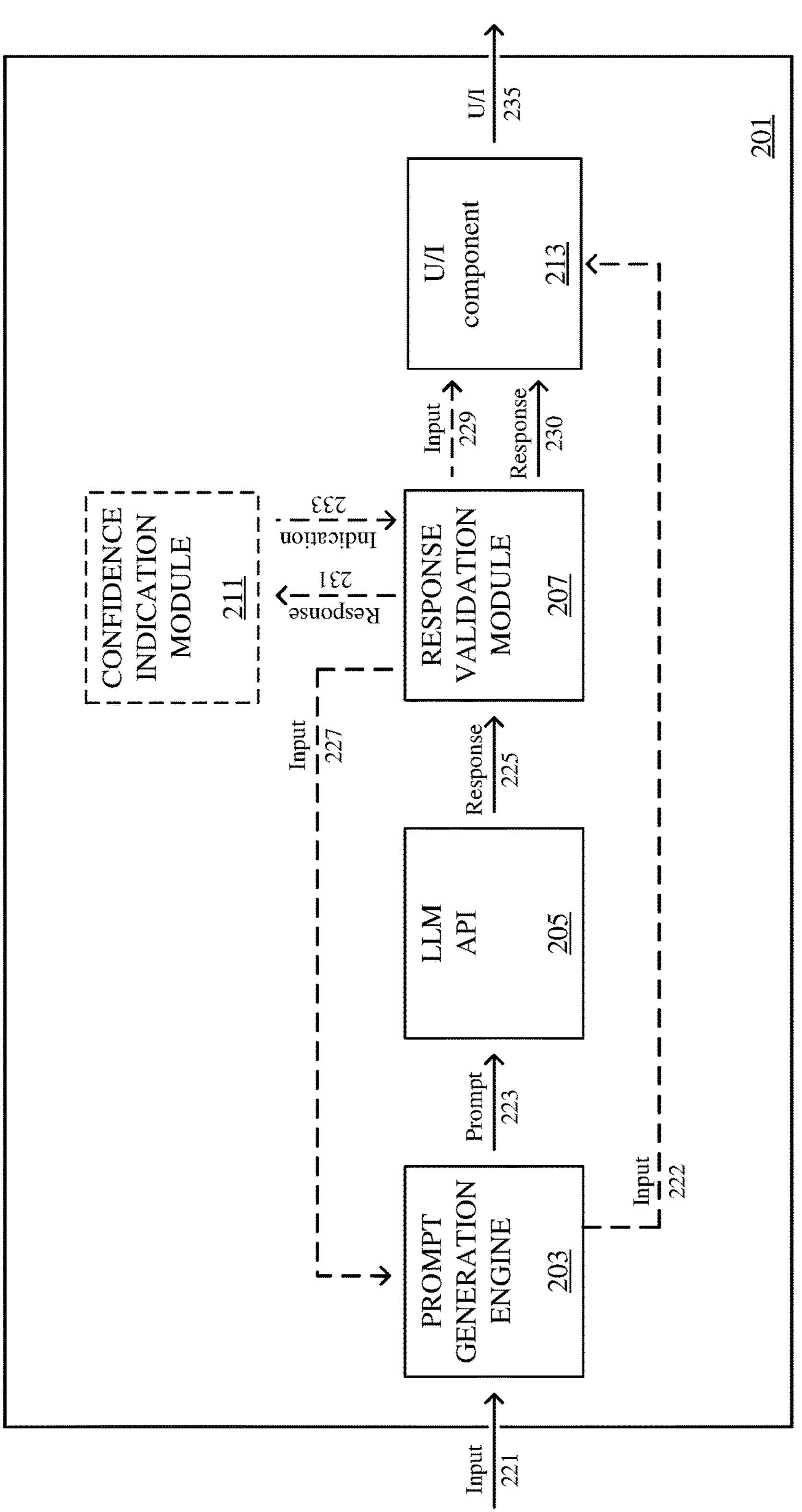
FIG. 2 illustrates a conceptual schematic in accordance with some embodiments of the present technology.

FIG. 2 illustrates a conceptual schematic 200 for configuring a device in accordance with some embodiments of the present technology. Schematic 200 includes application logic 201, of which application 107 of FIG. 1 and software 805 of FIG. 8 may be representative. Application logic 201 is implemented in program instructions that comprise various software modules, components, and other elements of the application such as engine 203, API 205, module 207, module 211, and component 213. Application logic 201 may be a locally installed and executed application, a desktop application, a mobile application, a streamed (or streaming) application, a web-based application that is executed in the context of a web-browser, or any other type of application capable of employing process 300 of FIG. 3. Though the functionality of application logic 201 is described as occurring within specific modules, it is contemplated herein that the disclosed functionality may be implemented by one or more of the software modules, components, and/or other elements of application logic 201 without departing from the scope of the disclosure.

Engine 203 is representative of a prompt generation engine that employs natural language processing and machine learning algorithms to generate natural language prompts for use with LLMs (e.g., model 103 of FIG. 1). Engine 203 includes a natural language model, a prompt database, and a prompt generator. The prompt database contains prompts that are related to fine-tuned models that were trained on task-specific data (e.g., acceptable questions and corresponding answers, speaking with a specific voice, categorization, identifying context of a user input, etc.) to learn patterns in language used in industrial automation environments and to understand the nuances of said language. The prompt generator of engine 203 uses the natural language model and prompt database to generate natural language prompts in response to user inputs (e.g., inputs 221 and 227). The prompt generator may use a variety of techniques, including rule-based systems, machine learning algorithms, and deep learning models, to generate accurate and effective prompts. Engine 203 is further configured to receive inputs 221 and 227 and to generate input 222 and prompt 223.

Engine 203 may also use a content gate that includes various rules to filter out user inputs when certain types of questions or information are encountered. For example, the content gate may, based on the various rules, prohibit answering queries that do not pertain to industrial automation systems, one of the defined categories, etc.; that are related to safety critical items or items for which human life may be in danger; etc. In such a scenario, engine 203 may generate input 222 and transmit input 222 to component 213. Input 222 may indicate that the user's inquiry cannot be answered and may instruct component 213 to either generate a user interface (e.g., requesting additional input) or cease interacting with the user (e.g., close a chat window, etc.). In the same or other embodiment, the content gate may include a rule to respond to a question that relates to a helpdesk entry by summarizing the helpdesk entry and providing additional information, to respond to a question that is unrelated to industrial automation by stating that only answers related to industrial automation can be answered, etc.

API 205 is representative of an application programming interface (API) to a large language model. Specifically, API 205 includes a set of programming instructions and standards for accessing and interacting with an LLM (e.g., model 103). API 205 is configured to receive prompt 223 from engine 203, transmit prompt 223 to the LLM, receive response 225 from the LLM, and transmit response 225 to module 207.

Module 207 is representative of a response validation module and is responsible for evaluating the quality and accuracy of responses received by API 205 from an LLM. To ensure the quality and accuracy of a response, module 207 may use a combination of rule-based systems and machine learning algorithms to validate the response and ensure that it meets certain criteria. For example, module 207 may validate a response based on factors such as the relevance of the response to a user's query (e.g., input 221), the accuracy of the information presented in the response, the naturalness and fluency of the language used in the response, etc. The response may also be validated to ensure it is free of biasing, expletives, and the like. Because LLMs are trained on enormous data sets that are not reviewed prior to training, the responses may include invalid data, erroneous data, biased data, inappropriate data, and the like. Module 207 may also incorporate feedback mechanisms that incorporate user ratings of the quality of responses as well as other feedback to improve future responses. Module 207 is further configured in some embodiments to receive response 225 from LLM API 205 and indication 233 from module 211. Module 207 is further configured in some embodiments to generate input 227 and response 231. Accordingly, in some embodiments, the LLM may validate its own response. Module 207 outputs the response 230 upon validation.

Module 211 is representative of an optional confidence indication module that provides an indication of the accuracy of the responses received from an LLM. Module 211 uses machine learning algorithms to analyze the response and generate a confidence score for each received response. The confidence score may be based on factors such as the accuracy of the language model, the relevance of the response to the user's query, and the degree of uncertainty in the data. Additionally, the confidence score can be used by application logic 201 to monitor the performance of the engine 203 with regard to the responses received by the LLM and identify areas for improvement. Module 211 is further configured to receive response 231 and to generate indication 233.

Component 213 is representative of a user interface component that presents graphical user interfaces for surfacing prompts, device configuration information, etc. and enables user interactions with application logic 201. Component 213 may include a set of graphical user interface (GUI) controls such as buttons, menus, text boxes, and other interactive elements that allow users to input data and interact with the system. Component 213 may interact with other components of application logic 201, such as the business logic layer, the data access layer, and the communication layer. For example, when a user enters data into a text box, the user interface component may communicate with the business logic layer to process the data and update the underlying data model. Component 213 is further configured to receive input 222, input 229, and input 227 and to generate user interface 235.

In an embodiment, engine 203 receives input 221. Input 221 may include a drag-and-drop of a graphic representation of a device (e.g., a driver of a conveyor system, a pump, a motor, a compressor, a valve, a robot, a program logic controller, etc.), a query (e.g., a request for information, etc.), a mouse click, a gesture, a voice command, and the like. Input 221 may also include an association between a device and a controller in an industrial automation system design.

Based at least on a context of input 221, engine 203 generates prompt 223. Prompt 223 may include a request for and/or an instruction to identify an application type. Examples of application types include, but are not limited to, a device type; a type of system in which the device may be implemented; a determination of whether the user is attempting to configure a device, model a system, troubleshoot an issue, etc. Engine 203 then transmits prompt 223 to API 205. API 205 transmits the prompt to an LLM (e.g., model 103 of FIG. 1) and receives response 225 from the LLM. API 205 then transmits response 225 to module 207.

Module 207 validates response 225. For example, module 207 may validate response 225 by performing a semantic analysis, sentiment analysis, topic modeling process, or the like. In some embodiments, Module 207 may validate a response from the LLM using the LLM by generating a prompt including the response in the prompt for validation. In such cases, the prompt including the response may be submitted as input 227 to engine 203 for obtaining the validation. In some embodiments, module 207 may validate a response, for example against a specification, such as validating controller code, power supply requirements, communication protocols, device settings, or the like. If module 207 determines that response 225 is invalid (e.g., response 225 includes a hallucination, unacceptable application type, etc.), then module 207 may generate input 227 and transmit input 227 to engine 203. Input 227 may include context for generating a follow-up prompt for submission by API 205 to the LLM. Alternatively, module 207 may generate input 229 and transmit input 229 to component 213. Input 229 may include context for generating a GUI that includes a request for additional information, a GUI that indicates an answer to the query is "unknown," and the like. If module 207 determines that response 225 is valid, then module 207 generates response 230 and transmits response 230 to component 213. Response 230 includes content of response 225 in some embodiments.

Prior to transmitting response 230, module 207 may alternatively generate response 231 and transmit response 231 to module 211. Response 231 includes content of response 225, which module 211 analyzes to generate indication 233. For example, module 211 may provide a confidence rating (e.g., 80% confident that the response is accurate, etc.) or a confidence score (e.g., high confidence, low confidence, etc.) based on response 231. The higher the rating and/or score, the greater confidence module 211 has in the accuracy of the response. After generating indication 233, module 211 transmits indication 233 to module 207, which incorporates indication 233 with response 230.

Component 213 receives response 230 (or input 229) from module 207 and generates user interface 235 based on response 230 (or input 229). If response 230 includes indication 233, then user interface 235 may present the content of indication 233 as a confidence level having a rating (e.g., 65% confident of the response's accuracy), having a color-coded score (e.g., a green color indicates high confidence, a red color indicates a low confidence, etc.), and the like.

Figure 3:
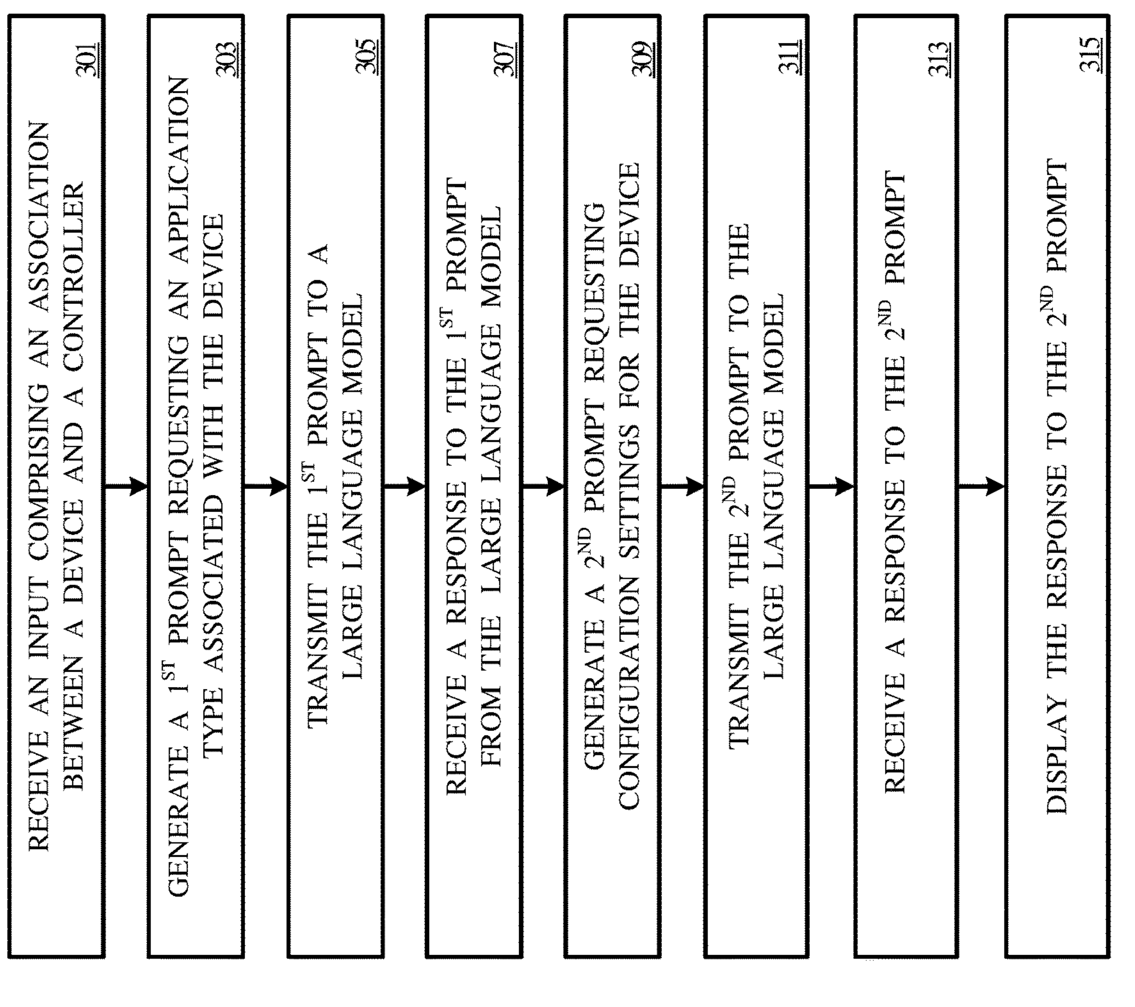
FIG. 3 illustrates an exemplary device configuration process in accordance with some embodiments of the present technology.
Figure 4:
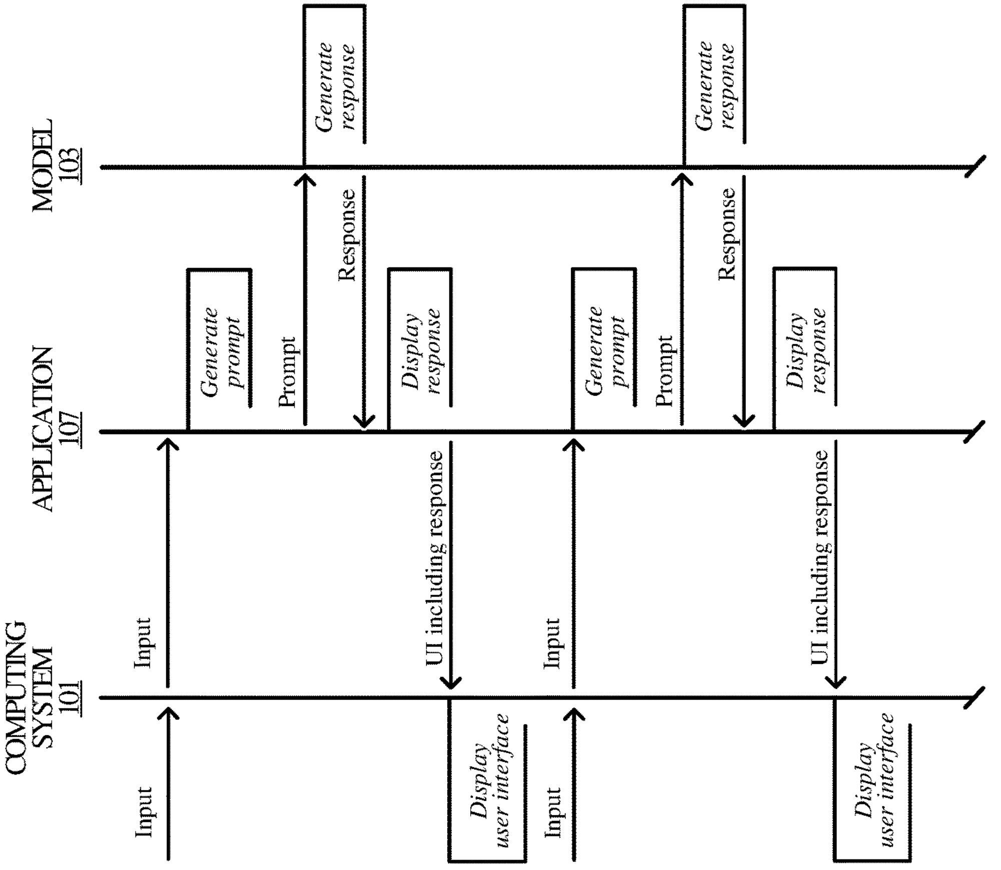
FIG. 4 illustrates an exemplary operational scenario in accordance with some embodiments of the present technology.
Figure 4:

FIG. 3 illustrates a series of steps for configuring a device in accordance with some embodiments of the present technology, and FIG. 4 illustrates exemplary operational scenario 400 in accordance with embodiments of the present technology. FIG. 3 includes process 300, each operation of which is noted parenthetically in the discussion below with reference to elements of FIG. 4. FIG. 4 includes computing system 101, application 107, and model 103 of FIG. 1. It may be appreciated that process 300 can be implemented in software, firmware, hardware, or any combination thereof and is representative of at least some of the functionality of application 107 of FIG. 1 and application logic 201 of FIG. 2. It may be further appreciated that process 300 is representative of device configuration process 806 of FIG. 8.

In operation, application 107 receives an input comprising an association between a device and a controller in an automation system design (step 301). For example, a user may interact with a GUI of application 107 by dragging-and-dropping a graphical representation of the device and/or the controller in a design environment of the GUI, which application 107 receives as an input. Alternatively, the user may submit a query via an input device (e.g., keyboard, microphone, stylus, etc.) of computing system 101, which application 107 receives as an input. Application 107 may also receive the input based on a mouse click of a selectable interface element, a gesture, a voice command, etc.

After receiving the input, application 107 generates a first prompt requesting an application type associated with the device (step 303). Application 107 may generate the first prompt based at least on system information (e.g., power capabilities of the system, attributes of the system, relationships between the devices of the system, data models of the system, etc.) associated with the automation system design, the device, the controller, or some combination thereof. The system information may include a device type (e.g., pump, actuator, motor, sensor, etc.), a controller type (e.g., programmable logic controller, etc.), a system taxonomy (e.g., communication protocols, connected devices, product inputs, product outputs, etc.), or some combination thereof.

The first prompt may be generated in response to receiving the input. The first prompt may be generated in response to receiving, via the GUI, a second input requesting assistance to configure the device. Application 107 may generate the first prompt by providing the input to a natural language model that transforms the input into an embedding. The embedding may be included in the first prompt and used by model 103 to select relevant content from an embedding database (e.g., using natural language).

The first prompt may include aspects of the user input, such as restating all or portions of a query input. The first prompt may include acceptable responses such as acceptable application types, product types, power capability, etc. The first prompt may include a required response. For example, in an embodiment, the first prompt may indicate which categories must be present in the response (e.g., application type, product type, power capability, network topology, etc.). In the same or other embodiment, the first response may indicate a required response to surface if an answer to the prompt is unknown (e.g., "I'm sorry, I'm unable to answer your query," etc.). In the same or other embodiment, the first response may indicate which phrase to include as part of a required response (e.g., "include the following at the end of your response: Do you require additional assistance," etc.). In the same or other embodiment, the first response may indicate when to include a request for additional information in the required response (e.g., "when a category is unknown, ask the user for the unknown category, in natural language as if you were a service desk employee").

Application 107 transmits the first prompt to model 103 (step 305). In the present embodiment, model 103 was trained via application 107 using content of an embedding database (not shown) such as saved projects, past workflows of industrial automation environments, helpdesk entries associated with the devices and systems of industrial automation environments, product catalogs associated with a plurality of devices and/or a plurality of controllers, scientific publications associated with a plurality of devices and/or a plurality of controllers, etc. Based on its training, model 103 generates a response based on the instructions of the first prompt and transmits the response to application 107.

Application 107 receives the response to the first prompt from model 103 (step 307). The response includes the requested application type. Subsequent to receiving the response, application 107 generates a GUI that includes the response to the first prompt and a message requesting user input that indicates an acceptance or a refusal for help configuring the device. Application 107 then transmits the GUI to computing system 101 for display by computing system 101 (step 309). Computing system 101 receives, via the GUI, a user input that indicates an acceptance of the device configuration help request and transmits the input to application 107.

Responsive to the user input requesting assistance to configure the device, application 107 generates a second prompt that includes an instruction requesting the LLM to provide configuration settings for the device (step 309). Configuration settings may include controller code, device component arrangement, input definitions, output definitions, etc. Application 107 may generate the second prompt by providing the input to a natural language model that transforms the input into an embedding. The embedding may be included in the second prompt and used by model 103 to select relevant content from an embedding database (e.g., using natural language). The second prompt may include aspects of the user input, acceptable responses, required responses, etc.

Application 107 transmits the second prompt to model 103 (step 311). Based on its training, model 103 generates a response to the second prompt and transmits the response to application 107.

Application 107 receives the response to the second prompt from model 103 (step 313). The response includes the requested configuration settings for the device. Subsequent to receiving the response, application 107 generates a GUI that includes the configuration information of the response to the second prompt. The GUI may also include a message requesting user input that indicates an acceptance or a refusal for configuring the device according to the response to the second prompt. Application 107 then transmits the GUI to computing system 101 for display by computing system 101 (step 315).

Figure 5:
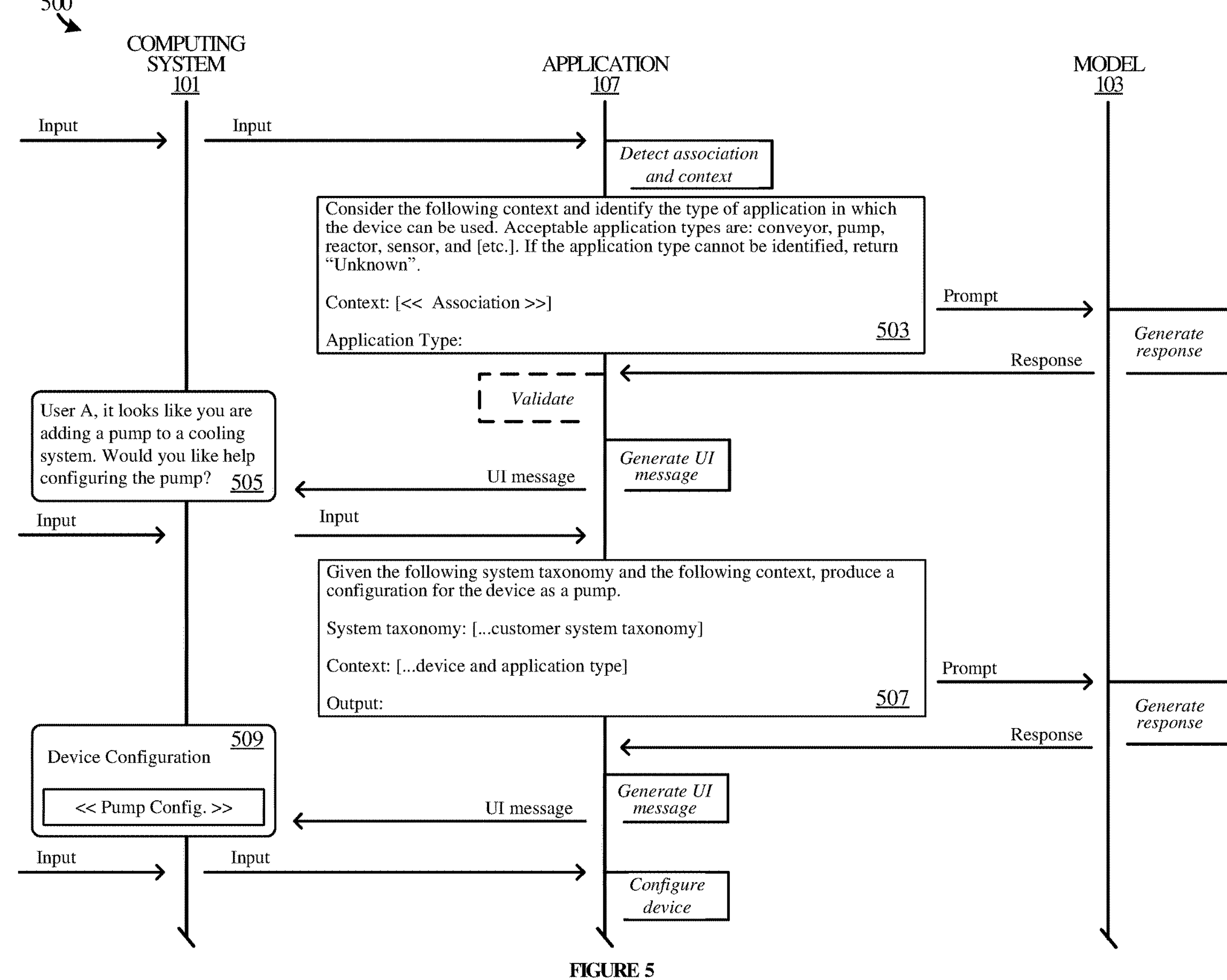
FIG. 5 illustrates an exemplary operational scenario in accordance with some embodiments of the present technology.

FIG. 5 illustrates exemplary operational scenario 500 in accordance with some embodiments of the present technology. The elements of operational scenario 500 include computing system 101, application 107, and model 103 of FIG. 1.

In operation, a user interacts with a GUI of application 107 via an input device (e.g., keyboard, mouse, microphone, stylus, camera, etc.) of computing system 101, which application 107 receives as an input. Responsive to the user input, application 107 detects an association of a device of an industrial automation system. The association may be between the device and a system, the device and a controller, or the like. The association may also include an initial categorization of the input (e.g., does the user input relate to device configuration, system design, troubleshooting, etc.). Application 107 may use a prompt generation engine (e.g., engine 203 of FIG. 2) to detect the association of the user input.

After detecting the association and the context, application 107 generates prompt 503 (e.g., via engine 203). Prompt 503 includes a request for an application type in which the device can be used. Prompt 503 also includes acceptable application types (e.g., conveyor pump, etc.), and a required response if the application type cannot be identified (e.g., "Unknown"). Prompt 503 further includes the association as a "context." Application 107 then transmits prompt 503 to model 103.

In the present embodiment, model 103 was trained using content of an embedding database (not shown), which may include past workflows of industrial automation environments, helpdesk entries associated with the devices and systems of industrial automation environments, product catalogs associated with a plurality of devices and/or a plurality of controllers, scientific publications associated with a plurality of devices and/or a plurality of controllers, defined bill of materials, etc. Model 103 may have been trained to respond to prompt 503 by ingesting data models that differed in context, scope, application, etc. and which made up at least some of the content of the embedding database. Based on its training and the content of the embedding database, model 103 generates a response to prompt 503. The response may include the requested application type and/or a required response. Model 103 then transmits the response to application 107.

Application 107 receives the response to prompt 503 and may optionally validate the response. Validating the response includes determining that the response is one of the acceptable application types. For example, if the response includes an acceptable application type, then the response may be valid, and if the response does not include an acceptable application type, then the response may be invalid. If the response is invalid (e.g., does not include an acceptable application type, includes an inaccurate application type, etc.), application 107 may generate and transmit new prompts requesting the application type, and may repeat this process until a valid response is received from model 103. In some embodiments, application 107 may use model 103 to validate the response by generating a prompt requesting validation of the response and submitting the prompt to model 103.

Subsequent to receiving and/or validating the response, application 107 generates a GUI that includes the application type (e.g., pump) and a message requesting user input that indicates an acceptance or a refusal of the device configuration help. Application 107 then transmits the GUI to computing system 101 for display by computing system 101 as user interface message 505. Computing system 101 then receives, via the GUI, a user input that indicates an acceptance of the device configuration help request and transmits the input to application 107.

Responsive to the user input requesting assistance to configure the device, application 107 generates prompt 507 requesting configuration settings for the pump. Prompt 507 includes a system taxonomy for the user and a context that includes the device and application type. Application 107 transmits the prompt 507 to model 103. Based on its training, model 103 generates a response to the prompt 507 and transmits the response to application 107.

Application 107 receives the response to prompt 507 and may optionally validate the response. Validating the response includes determining that the response includes an acceptable pump configuration according to the system taxonomy, application type, etc. If the response is invalid (e.g., does not include an acceptable pump configuration, etc.), application 107 generates and transmits new prompts requesting configuration settings for the device until a valid response is received from model 103. In some embodiments, application 107 validates the response using model 103 by generating a prompt requesting validation of the response and submitting the prompt to model 103.

Subsequent to receiving and/or validating the response, application 107 generates a GUI that includes at least a portion of the configuration information provided in the response to prompt 507. The GUI may also include a message requesting user input that indicates an acceptance or a refusal to have application 107 configure the pump according to the displayed configuration information. Application 107 then transmits the GUI to computing system 101 for display by computing system 101 as message 509.

Computing system 101 receives, via the GUI, a user input accepting the configuration settings displayed in message 509. Responsive to the user input, application 107 configures the pump according to the configuration settings.

Figure 6:
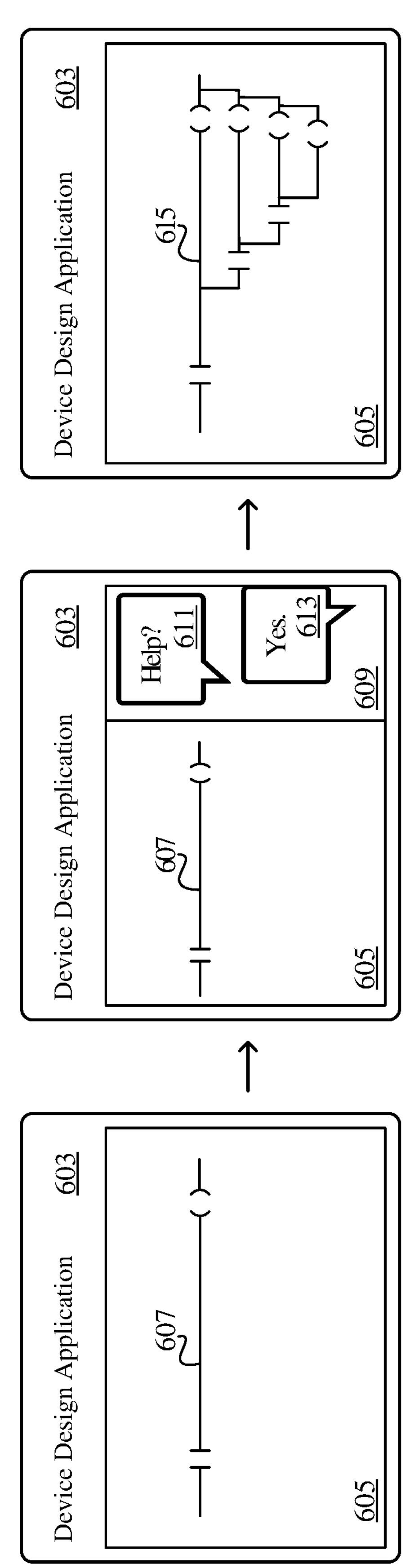
FIG. 6 illustrates an exemplary user interface in accordance with some embodiments of the present technology.

FIG. 6 illustrates an exemplary user interface 603 to a device design application (e.g., application 107 of FIG. 1) that employs a device configuration process (e.g., process 300 of FIG. 3) in accordance with some embodiments of the present technology. User interface 603 includes design environment 605, which initially includes ladder logic 607 of a device.

Responsive to detecting ladder logic 607, the device design application employs a device configuration process to generate a prompt (not shown) for submission to a LLM (not shown). The prompt contains a natural language query requesting configuration information based on a context of ladder logic 607. Examples of context include user information stored in association with a user's account, a product type, an application type, a network topology, a customer company, a power capability, available IP addresses, Azure® subscription identifiers, etc. After receiving the prompt, the LLM transmits a response to the device design application that includes the configuration information.

Then, the device design application displays messaging panel 609 adjacent to design environment 605 in user interface 603. Messaging panel 609 is representative of a chat window through which a user communicates with the device design application. Messaging panel 609 may include buttons, menus, or images that can be used to provide additional information or context. Though messaging panel 609 is depicted as being a sidebar panel of user interface 603, it is contemplated herein that messaging panel 609 can be any user interface component capable of supporting user interactions with the device design application in a natural and conversational manner. For example, messaging panel 609 may be a popup or dialog window that overlays the content of design environment 605, and the like.

Messaging panel 609 includes messages 611 and 613. The device design application may generate and surface message 611, for example in response to detecting ladder logic 607, in response to receiving a response from the LLM, in response to a query submitted by the user, etc. Message 611 asks the user if help is needed to configure the device of ladder logic 607. Message 613 includes a user's reply to message 611, which indicates that "Yes," help is needed.

In response to message 613, the device design application configures the device of ladder logic 607 and generates ladder logic 615. The device design application then updates design environment 605 to include ladder logic 615.

Figure 7:
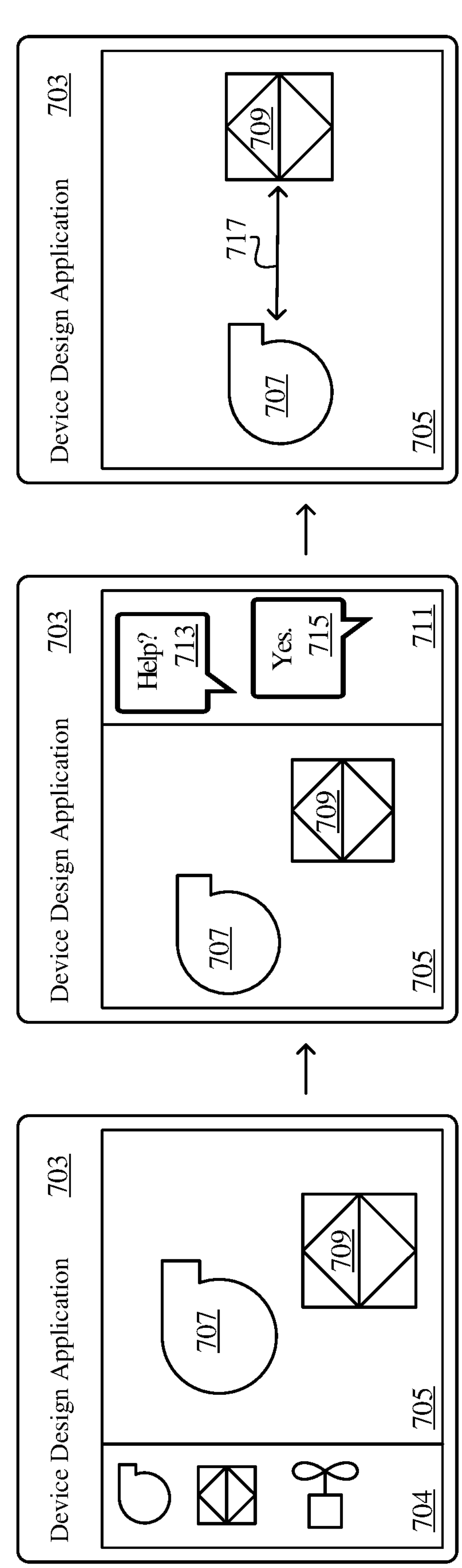
FIG. 7 illustrates an exemplary user interface in accordance with some embodiments of the present technology.

FIG. 7 illustrates an exemplary user interface 703 to a device design application (e.g., application 107 of FIG. 1) that employs a device configuration process (e.g., process 300 of FIG. 3) in accordance with some embodiments of the present technology. User interface 703 initially includes device menu 704 and design environment 705. Design environment 705 includes pump 707 and controller 709, which were both added to design environment 705 as a result of a user selecting their representative icon from device menu 704.

Responsive to detecting an association between pump 707 and controller 709, the device design application employs a device configuration process to generate a prompt (not shown) for submission to a LLM (not shown). The prompt contains a natural language query requesting configuration information based on a context of the association. Examples of context include user information stored in association with a user's account, a product type, an application type, a network topology, a customer company, a power capability, available IP addresses, Azure® subscription identifiers, etc. After receiving the prompt, the LLM transmits a response to the device design application that includes the configuration information.

Then, the device design application displays messaging panel 711 adjacent to design environment 705 in user interface 703. Messaging panel 711 is representative of a chat window through which a user communicates with the device design application. Messaging panel 711 may include buttons, menus, or images that can be used to provide additional information or context. Though messaging panel 711 is depicted as being a sidebar panel of user interface 703, it is contemplated herein that messaging panel 711 can be any user interface component capable of supporting user interactions with the device design application in a natural and conversational manner. For example, messaging panel 711 may be a popup or dialog window that overlays the content of design environment 705, and the like.

Messaging panel 711 includes messages 713 and 715. The device design application may generate and surface message 713, for example in response to detecting the association between pump 707 and controller 709, in response to receiving a response from the LLM, in response to a query submitted by the user, etc. Message 713 asks the user if help is needed to configure pump 707. Message 715 includes a user's reply to message 713, which indicates that "Yes," help is needed.

In response to message 715, the device design application c configures pump 707 to communicate with controller 709 and generates configuration 717. The device design application then updates design environment 705 to include configuration 717.

FIG. 8 illustrates computing device 801 that is representative of any system or collection of systems in which the various processes, programs, services, and scenarios disclosed herein may be implemented. Examples of computing device 801 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 801 may be implemented as a single apparatus, system, or device or may be implemented in a distributed manner as multiple apparatuses, systems, or devices. Computing device 801 includes, but is not limited to, processing system 802, storage system 803, software 805, communication interface system 807, and user interface system 809 (optional). Processing system 802 is operatively coupled with storage system 803, communication interface system 807, and user interface system 809.

Processing system 802 loads and executes software 805 from storage system 803. Software 805 includes and implements device configuration process 806, which is (are) representative of the application service processes discussed with respect to the preceding Figures, such as process 300. When executed by processing system 802, software 805 directs processing system 802 to operate as described herein for at least the various processes, operational scenarios, and sequences discussed in the foregoing implementations. Computing device 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated or transitory signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including device configuration process 806) may be implemented in program instructions and among other functions may, when executed by processing system 802, direct processing system 802 to operate as described with respect to the various operational scenarios, sequences, and processes illustrated herein. For example, software 805 may include program instructions for implementing an application service process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing device 801 is representative) overall from a general-purpose computing system into a special-purpose computing system customized to support an application service in an optimized manner. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system or method and may include a computer program product, and other configurable systems. Accordingly, aspects of the present invention may take the form of an entirely hardware embodiment or an embodiment combining software (including firmware, resident software, micro-code, etc.) and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising." and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of operating an interface service, the method comprising:

receiving, via a graphical user interface (GUI) of a design application, an input comprising an association between a device and a controller in an automation system design;

generating a first prompt requesting an application type associated with the device, wherein the first prompt is generated based at least in part on system information associated with the automation system design, the device, and the controller;

transmitting the first prompt to a large language model;

receiving a first response to the first prompt from the large language model, the first response comprising the application type;

generating a second prompt requesting configuration settings for the device based on the system information and the application type;

transmitting the second prompt to the large language model;

receiving a second response to the second prompt, the second response comprising configuration settings for the device; and displaying, via the GUI, the second response.

2. The method of claim 1, further comprising:

validating the second response;

responsive to identifying a valid second response, displaying the second response;

responsive to identifying an invalid second response, repeating until a valid response is returned:

generating a new prompt requesting the configuration settings for the device based on the system information and the application type;

transmitting the new prompt to the large language model;

receiving a new response to the new prompt; and validating the new response; and responsive to identifying a valid new response, displaying the new response.

3. The method of claim 1, wherein the first prompt comprises acceptable responses for the application type.

4. The method of claim 1, wherein the first prompt comprises a required response if the application type cannot be identified.

5. The method of claim 1, wherein the system information comprises at least one of a device type, a controller type, and a system taxonomy.

6. The method of claim 1, wherein the device is a first device of a plurality of devices and the controller is a first controller of a plurality of controllers, the method further comprising training the large language model using helpdesk entries and product catalogs associated with the plurality of devices and the plurality of controllers.

7. The method of claim 1, wherein generating the first prompt is in response to receiving the input.

8. The method of claim 1, wherein generating the first prompt is in response to receiving, via the GUI, a second input requesting assistance to configure the device.

9. The method of claim 1, further comprising: in response to receiving the first response, displaying, via the GUI, a message requesting user input indicating an acceptance or a refusal for device configuration help.

10. The method of claim 9, wherein generating the second prompt is in response to receiving the user input indicating the acceptance.

11. The method of claim 1, wherein the displaying the second response comprises:

inputting the configuration settings to a second machine learning model trained to generate a user interface message for displaying at least aspects of the configuration settings;

receiving a third response comprising the aspects of the configuration settings; and displaying, via the GUI, the third response.

12. The method of claim 11, wherein the second machine learning model is the large language model.

13. The method of claim 1, further comprising:

receiving, via the GUI, user input accepting the configuration settings displayed in the second response; and configuring the device according to the configuration settings.

14. A system, comprising:

one or more processors; and a memory having stored thereon instructions that, upon execution by the one or more processors, cause the one or more processors to:

receive, via a graphical user interface (GUI) of a design application, an input comprising an association between a device and a controller in an automation system design;

generate a first prompt requesting an application type associated with the device, wherein the first prompt is generated based at least in part on system information associated with the automation system design, the device, and the controller;

transmit the first prompt to a large language model;

receive a first response to the first prompt from the large language model, the first response comprising the application type;

generate a second prompt requesting configuration settings for the device based on the system information and the application type;

transmit the second prompt to the large language model;

receive a second response to the second prompt, the second response comprising configuration settings for the device; and display, via the GUI, the second response.

15. The system of claim 14, wherein the instructions further cause the one or more processors to:

receive a positive indication, via the GUI, to the second response;

identify a system taxonomy associated with the device;

input the system taxonomy and the application type to a machine learning model trained to ingest system taxonomies and output configuration data; and receive configuration data for the device.

16. The system of claim 14, wherein the instructions further cause the one or more processors to:

validate the second response;

responsive to identifying a valid second response, display the second response;

responsive to identifying an invalid second response, repeat until a valid response is returned:

generate a new prompt requesting the configuration settings for the device based on the system information and the application type;

transmit the new prompt to the large language model;

receive a new response to the new prompt; and validate the new response; and responsive to identifying a valid new response, display the new response.

17. The system of claim 14, wherein the system information comprises at least one of a device type, a controller type, and a system taxonomy.

18. The system of claim 14, wherein the device is a first device of a plurality of devices and the controller is a first controller of a plurality of controllers, and wherein the instructions further cause the one or more processors to train the large language model using helpdesk entries and product catalogs associated with the plurality of devices and the plurality of controllers.

19. The system of claim 14, wherein to display the second response the instructions cause the one or more processors to:

input the configuration settings to a machine learning model trained to generate a user interface message for displaying at least aspects of the configuration settings;

receive a third response comprising the aspects of the configuration settings; and display, via the GUI, the third response.

20. The system of claim 14, wherein the instructions further cause the one or more processors to:

receive, via the GUI, user input accepting the configuration settings displayed in the second response; and configure the device according to the configuration settings.

* * * * *